June 15, 1948.   C. N. KIMBERLIN, JR., ET AL   2,443,462
PROCESS FOR DRYING SPHERICAL HYDROGEL CATALYSTS
Filed March 4, 1944
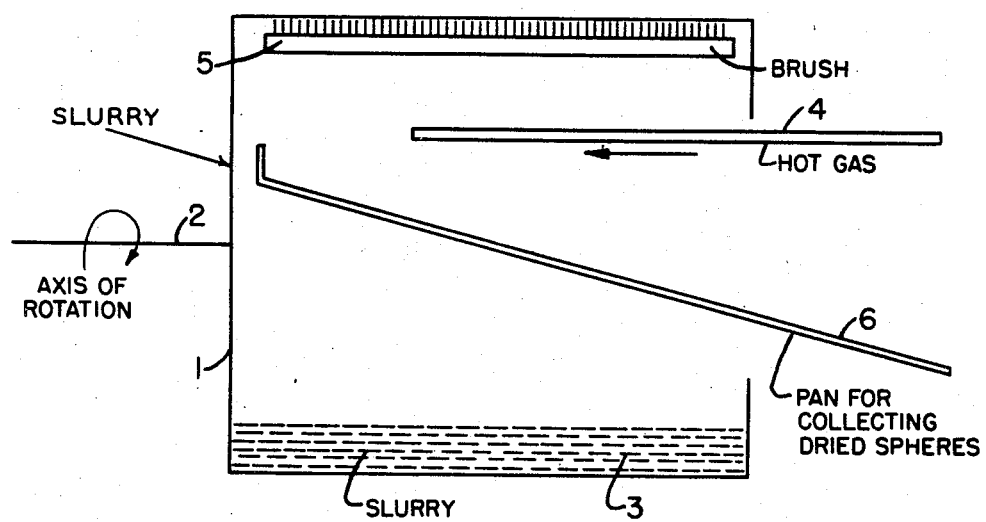

Patented June 15, 1948

2,443,462

UNITED STATES PATENT OFFICE 2,443,462

PROCESS FOR DRYING SPHERICAL HYDROGEL CATALYSTS

Charles N. Kimberlin, Jr., and Jerry A. Pierce, Baton Rouge, La., assignors to Standard Oil Development Company, a corporation of Delaware Application March 4, 1944, Serial No. 525,054

3 Claims. (Cl. 34—9)

This invention relates to a process for the drying of hydrous oxides and more particularly it relates to the drying of hydrogels having a spherical form.

Inorganic gels are well known and have been long used for various purposes, for example for the adsorption of condensible vapors from gaseous carriers and for catalytic purposes as a catalyst itself or as a component thereof or as a carrier. The most widely used of these inorganic gels in the dried condition is that of silica with or without the use of other gelatinous materials such as alumina. However, other gels are known such as alumina, titania, zirconia, and the like.

These gels have been found to be particularly useful as catalysts for carrying out reactions involving hydrocarbons. These catalysts are particularly adapted for use in the so-called fluid catalyst process in which the catalyst is in a powdered form and is aerated or fluidized by means of a gas so that it acquires the properties of a liquid such as fluid flow, hydrostatic pressure and the like. These powdered catalysts are generally prepared by grinding silica gell or other types of gel catalysts to the desired size. Recently it has been found that catalysts having a particle size within the desired range for the fluid catalyst process, that is between 20 and 120 microns, can be prepared by causing a sol of the desired gel forming substance to set while dispersed in a water-immiscible liquid such as oil whereby spherical particles having diameters up to 1 mm. are obtained, the actual diameters depending upon the degree of dispersion, which in turn is dependent upon the viscosity of the oil, the amount of agitation and emulsifier used. The spherical particles thus obtained are washed and dried usually in air and then heated to a temperature of about 850 to 1200° F. for activation. However, when these spheres are dried in this manner it is found that they tend to agglomerate so that the advantage of the spherical form is lost.

It is therefore one object of this invention to provide a more efficient method for drying hydrogel spheres.

It is another object of this invention to dry hydrogel spheres in such a manner as to prevent the agglomeration of the individual spheres.

These and other objects of this invention are attained by drying hydrogels as a thin film or layer on a solid surface, advantage being taken of the fact that when a smooth impervious surface is immersed in a slurry of the spheres, a film only one particle deep is formed. The manner in which this process may be carried out will be fully understood from the following description when read with reference to the accompanying drawing which is a diagrammatic view in sectional elevation of one type of suitable apparatus.

Referring to the drawing, 1 is a hollow drum rotating on an axis into which is placed a slurry of hydrogel spheres which collects in a body or pool in the lower section of the drum as represented by the numeral 3. This slurry may be a mixture of hydrogel spheres with water, with a partially water-miscible liquid such as normal butanol, with a completely water-miscible liquid such as isopropanol or with a water-immiscible liquid such as oil. As drum 1 is allowed to rotate a thin film of slurry one particle deep adheres to the inside surface of the drum. Into this drum is introduced a hot inert gas such as air, nitrogen, carbon dioxide, etc., through line 4. This gas is at a temperature sufficiently high to quickly evaporate the liquid from the hydrogel, at least above 150° F. During this drying some shrinkage of the gel structure occurs with the result that the spherical particles draw away from each other and no agglomeration of the individual spheres occurs. The temperature of the gas and the rotation of the drum should be so correlated that by the time that the drum rotates so that the film is at the top, the water will be removed from the hydrogel. At this point the film comes in contact with a fixed brush 5 which quickly removes the dry particles from the surface of the drum into a collecting pan 6. From this pan the dry spheres may be removed to be treated in any manner desired; for example the spheres may be heated to a temperature of 850 to 1200° F. for activation before using. The process may be made continuous by continuously adding a slurry of hydrogels into the drum and continuously removing the dried spheres in pan 6.

The process of the present invention may be widely varied for example, the method described may be applied to the drying of any type of hydrogel, however formed or in whatever shape, although the advantages of the invention are most pronounced when drying hydrogel spheres. Also the apparatus used may be varied without departing from the broad concept of drying a slurry of hydrogel in a thin film. Various modifications which will occur to one skilled in the art may be used without departing from the spirit of this invention.

The spherical gels prepared according to this invention are particularly suitable as catalysts for use in the fluid catalyst type of process since they can be prepared in a narrower size range than any other method of preparing catalysts and do not suffer attrition to the extent of irregular-shaped catalysts. For example, they may be used for hydrogenating, alkylating and isomerizing hydrocarbons, reforming and desulfurizing naphtha and hydrogenating oxides of carbon and for any chemical reaction adaptable to the fluid technique.

The nature and objects of this invention having thus been fully set forth and an illustrative embodiment thereof given, what is claimed as new and useful and desired to be secured by Letters Patent is:

1. Process for preparing dry adsorbent inorganic gels in spherical form from hydrogel spheres which comprises introducing a slurry of said hydrogel spheres into a pool of said slurry in the lower section of a horizontal cylindrical drum, said cylindrical drum being characterized by having a smooth impervious inner surface, causing the formation of a layer of said hydrogel spheres one sphere thick on said smooth surface by rotating the said drum on its horizontal axis, drying the layer of spheres on said inner surface by applying heat to said layer after it has left the pool of said slurry and removing and recovering individual spheres of hydrogel from said surface before said surface is returned to the main body of hydrogel slurry.

2. Process according to claim 1 in which the drying of the layer of hydrogel spheres on the smooth inner surface of the cylindrical drum is accomplished by introducing hot inert gases into the upper section of said drum.

3. Process according to claim 1 in which the slurry of hydrogel spheres is a water slurry.

CHARLES N. KIMBERLIN, JR.
JERRY A. PIERCE.

REFERENCES CITED

The following references are of record in the file of this patent:

UNITED STATES PATENTS

| Number | Name | Date |
| --- | --- | --- |
| 677,902 | Stoddard | July 9, 1901 |
| 1,389,597 | Robinson | Sept. 6, 1921 |
| 1,944,452 | Ochs | Jan. 23, 1934 |
| 2,266,636 | Hauser | Dec. 16, 1941 |
| 2,284,248 | Baker | May 26, 1942 |
| 2,345,600 | Heard | Apr. 4, 1944 |